Jan. 16, 1968     G. LÓPEZ-CASTILLÓN     3,363,348
ANIMATED PICTURE SIGN

Filed Oct. 16, 1964     2 Sheets-Sheet 1

INVENTOR
GUILLERMO LOPEZ-CASTILLON 3,363,348
ANIMATED PICTURE SIGN
Guillermo López-Castillón, 1120 Market St.,
Laredo, Tex. 78040
Filed Oct. 16, 1964, Ser. No. 404,419
2 Claims. (Cl. 40—34)

My invention is concerned with animated picture signs, and more particularly to a sign wherein a movable body representing a rocket, satellite, missile, aerospace capsule, aircraft or any other similar figure, simulates to write a number of separate legends, these legends being arranged on an intermittently turning disc, while a constantly revolving flat screen temporarily hides the legends, apparently erasing the last exposed one, at the same time that the succeeding legend is changed into viewing position.

A further object of the invention is to provide a cabinet-enclosed apparatus having a shuttered window through which a series of legends are intermittently and successively viewed, the movement incidental to the changing of such legends being screened by a revolving shutter, operating between the legends and said windowed cabinet, while a movable body at the front of the cabinet simulates to write the legends as they are viewed through the window.

A still further object of the invention is the provision of an interesting central object representing the moon, the earth or unisphere, a star, etc., around which the movable body is travelling, thus forming a simply constructed, smoothly operating automatic legend changing display, attractive to anybody and particularly useful for indoors and outdoor advertising.

To the accomplishment of these and related objects as shall become apparent as the description proceeds, my invention resides in the construction, combination and arrangement of parts, as well as in the visual effect achieved, as shall be hereinafter described with reference to the attached drawings in which the same reference characters are used to designate identical parts in all the figures, of which:

Figure 1:
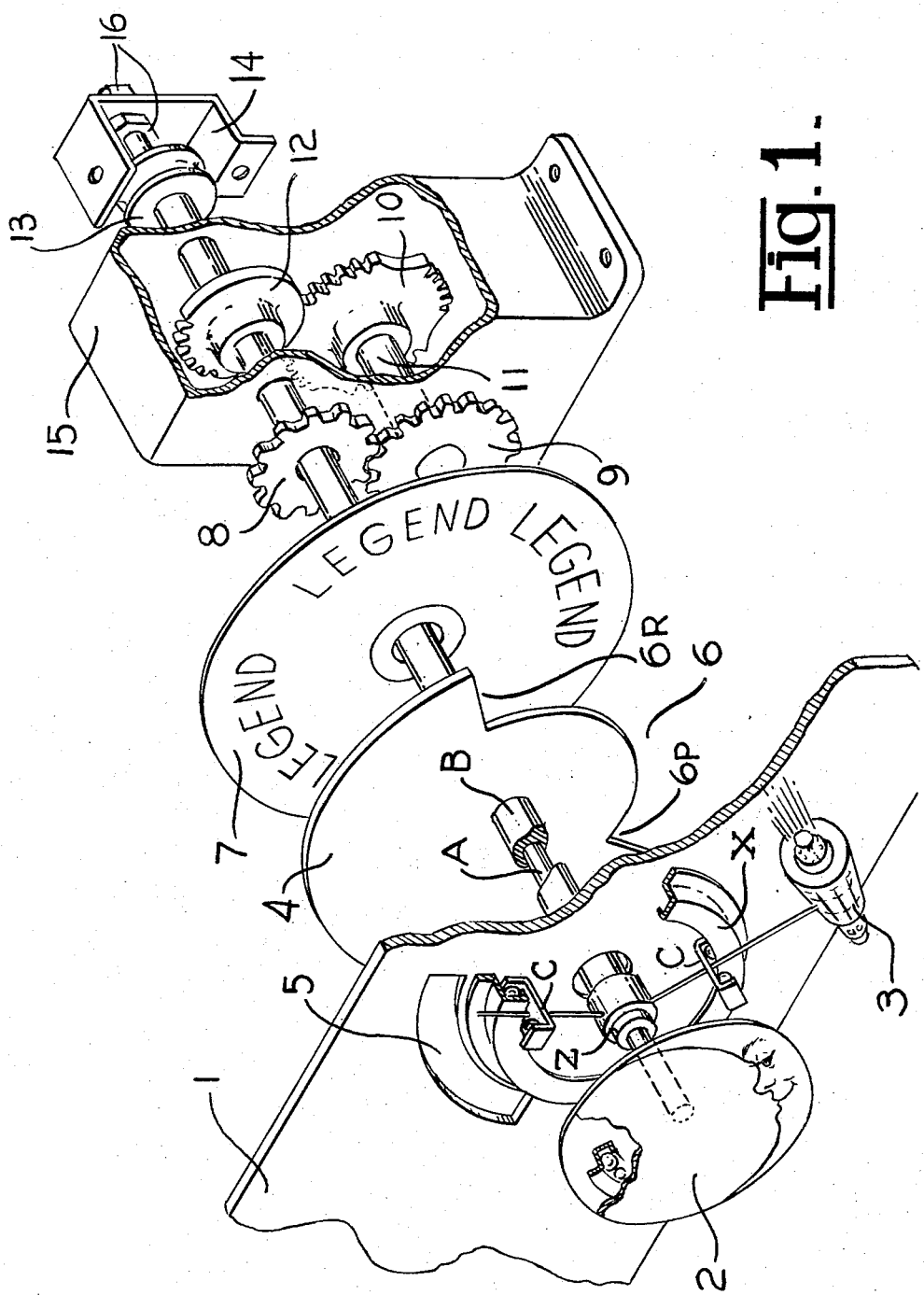
FIGURE 1 is a perspective view of the assembled mechanism.

In the presently illustrated construction of the invention the apparatus is shown in FIG. 1 as comprising a conveniently built cabinet, accordingly to the size and use of the sign, the front 1 of said cabinet having a window 5 therein cut, through which legends on disc 7 are viewed when disclosed by the shutter screen 4. A gear box 15 by some means attached to the bottom of said cabinet has a support 14 screwed at its rear face. Passing through said support 14 and held in place with nuts 16 is a rod or spindle A, the opposite end of which extends to the front 1 of the cabinet and to which a front and motionless disc 2 is attached. A loose sleeve B surrounds the spindle A being supported by means of bearings at the front and rear faces of gear box 15 and extending to front and back of said gear box 15 being freely rotatable. The sleeve B is tightly connected to the drive pulley 13, between the gear box 15 and the support 14, and inside the gear box 15 connects in a tight press fit to the segmental gear 12. This segmental gear 12 intermittently meshes with an alternating gear 10 which is connected in a tight press fit to shaft 11, which is held in place by means of bearings, its front end projecting out of the gear box.

At the free end of such shaft 11 connects a gear 9 that meshes with a companion gear 8, this gear 8 is screwed to the legend disc 7 and both of them loose fit mounted on the sleeve B. Between such legend disc 7 and the front 1 of the cabinet is the shutter screen 4 tight fit mounted on the sleeve B and consisting of a flat disc with a segment therein recessed. A hub Z attached at the front end of sleeve B and outside of front 1 of cabinet, has two braces holding the slides C which travel along guide X relieved by ball bearings. One of these braces protrudes out of guide X having the movable body 3 attached at its end.

In the operation of this automatic sign display the drive pulley 13 receives rotational motion from an electrical motor or any other source of motion, and transmits it to the loose sleeve B, which in time actuates the segmental gear 12. This segmental gear 12 controls the position of the alternating gear 10 by means of the corresponding round sections of each gear, besides the segmental gear 12 intermittently meshes with the alternating gear 10 which rotates only one, half, one third, one fourth, or one fifth of a turn, accordingly to the design of these Geneva gears. The alterating gear 12 transmits this intermittent motion to the gear 9 on shaft 11, which in the time actuates gear 8, loose fit on sleeve B, and to which legend disc 7 is attached. Because gear 8, and legend disc 7 are loose fit mounted on sleeve B, both of these parts are able to rotate partially, while sleeve B, as well as the recessed shutter screen 4 rotate continuously. When the recessed segment 6R matches with opening 5 in the front 1 of the cabinet a legend disc 7 is in viewing position through said opening 5. As the recessed shutter screen continues rotating, the window opening 5 becomes totally covered obscuring the legend disc 7, while this same disc rotates partially to bring the next legend into viewing position. At the same time the movable body 3 in front of the cabinet rotates around the central object 2 impulsed by the motion of the loose sleeve B to which it is tightly connected by means of braces and hub Z. The position of this movable object in regard to the shutter screen 4 is so arranged that it coincides with the end of the recess 6R that first appears through window 5, thus helping to give the illusion of simulated writing by the travelling or movable object. Another figure or object such as a cloud, comet or the like can be used to give an effect of disappearing the legend or product shown. The front and central object 2, however, remains motionless during all the performance of the apparatus, as it is fixed to the spindle A which is held in place by means of the nuts 16.

Figure 2:
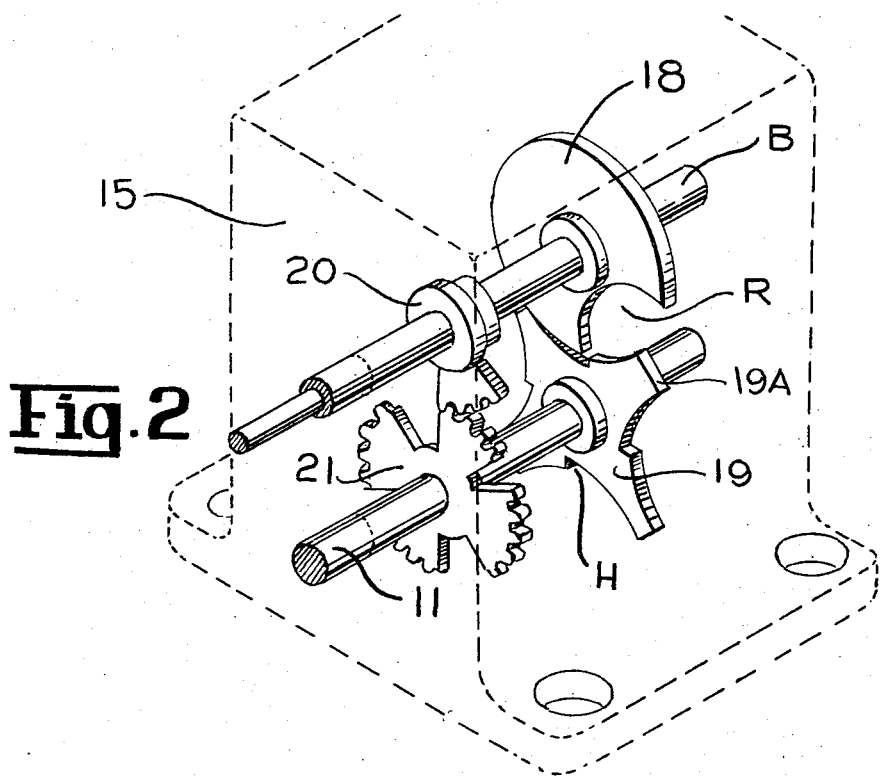
FIGURE 2 is a fragmentary perspective view showing a different mechanism to obtain timed motion for the same final effect.

FIGURE 2 shows a different way to obtain the timed motion for the legend disc 7. In the embodiment of this figure the loose sleeve B, which passes through the gear box 15, has a gear segment 20 and a disc member 18. Segment 20 subtends an angle which can be of 120°, 90°, 72°, 60°, etc., in accordance with the changes of legends in disc 7 of FIG. 1. For the other hand, the disc member 18 has an arcuate notch R also subtending the same angle as in gear segment 20, and aligned with said gear segment 20. Parallel to the loose sleeve B, shaft 11 is also installed inside the gear box 15, and carries a polygonal cam member 19, of many sides as changes has the legend disc 7, coplanar with disc member 18 and extending its edge in close contact with the periphery of said disc member. This cam member 19 has also a notch H cut at every curved side of the polygon the corners of which have a round shape to facilitate a smooth operation. Shaft 11 also carries a gear 21 divided into several sectors as required by the changes in the legend disc 7 of the FIGURE 1.

In the operation of this arrangement, gear segment 20 is out of mesh with gear 21 during the fraction of a cycle of rotation of sleeve B equivalent to the non-toothed portion of the gear segment 20. During this period the shaft 11 remains stationary as well as the legend disc 7 of FIGURE 1. When segment 20 rotates into mesh with gear 21, shaft 11 also rotates transmitting its motion to the gear that actuates the legend disc 7 (not shown in FIG. 2). A corner 19A of polygonal cam member 19 enters the arcuate notch R of disc member 18, and when segment 20 completes its engagement with gear 21 the notch R moves past said corner, causing the cam 19 to be positively rotated to its following position. The notches H in every side of the polygon in the cam 19 help the timing of the proper engaging of segment gear 20 and gear 21 avoiding jamming of teeth if cam member 19 turns before gears 20 and 21 are in proper position to mesh.

Figure 3:
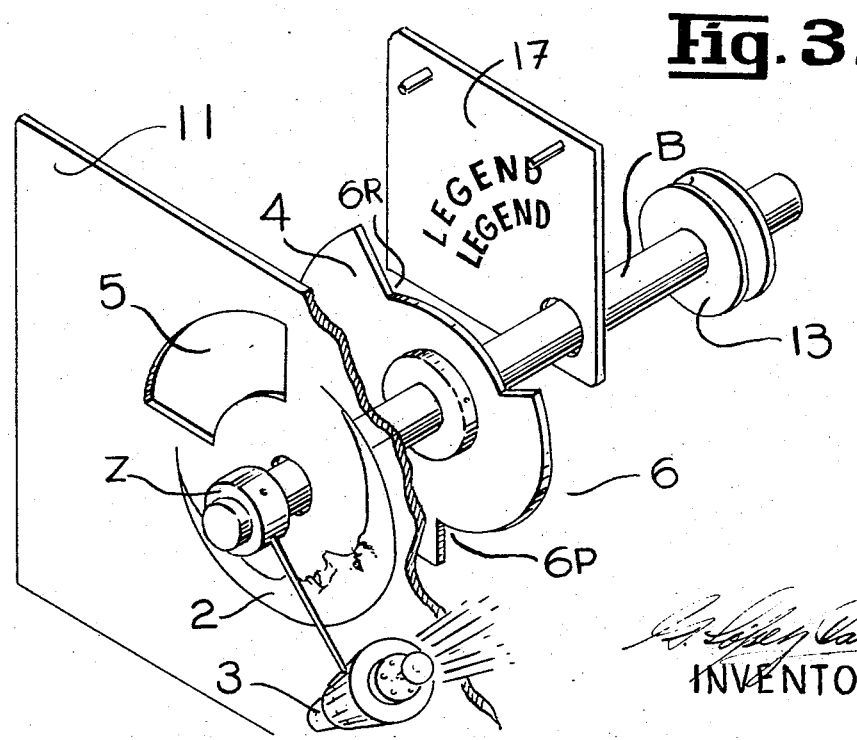
FIGURE 3 is a partial view showing only the parts required for the simulated writing and erasing action, when just one legend is displayed. Here the central object is painted on the cabinet front, instead of being a separate component as in FIG. 1.

FIGURE 3 shows an arrangement used when only one legend is to be alternately obscured and displayed through the opening in front of cabinet. In this embodiment solid shaft B is by some means held, loose fit perpendicular to the front 1 of the cabinet. The pulley 13 at the rear end of said shaft B receives motion from an electrical motor or any other source. A sector 17 is held behind the front 1 of the cabinet which has a window 5 therein recessed this sector being in perfect alignment with said window opening 5. Between the front 1 of the cabinet and the sector 17 a shutter disc 4 is connected to the shaft B, this shutter disc having recesses 6R and 6P, each with a different radius to allow that two different lines be displayed in the same sector 17. A hub Z is attached at the front end of shaft B having a rod attached which extends radially and square with shaft B and having a movable object 3 attached at its outer end.

In this arrangement the operation is very simple. The pulley 13 receives motion from an outer source and transmits it to the shaft B on which the shutter disc 4 is tight fit mounted, having the recesses 6P and 6R which intermittently obscures the legend in a stationary sector 17 held behind such shutter disc, through the opening 5 at the front of cabinet. The same shaft B transmits motion to the movable object 3 to which it is connected by means of hub Z and a brace. This movable object is arranged in such position that it coincides with the edge of the recess 6P, which appears through opening 5 in front of cabinet, thus simulating that it is the movable object which writes the legends when passing in front of opening 5. This movable object 3 revolves around a central object 2 which is painted or by some means illustrated on the front 1 of cabinet.

When I have illustrated and described a more or less specific sign changing design, with a space capsule constantly turning around the moon, and simulating to alternately write and erase commercial legends, it will be understood that my invention is not confined to any specific central subject, nor to legends specifically, and that I do not desire to be limited in the interpretation of the following claims except as may be necessitated by the state of the prior art.

What I do claim as new and desire to secure by Letters Patent of the United States is:

1. A display apparatus comprising an intermittently revolvable disc divided into sectors on which legends are displayed, a continuously revolvable shutter disc, with a recess therein cut and which partially covers said revolvable legend disc, a cabinet in the front of which a window is open through which legends on said legend disc are exhibited, a horizontal spindle extending back from and perpendicular to the front of said cabinet, a gear box attached at the bottom of said cabinet, said spindle extending through said gear box, a loose sleeve surrounding said spindle having a tight fit engagement with said shutter disc, a gear on said sleeve, near the said gear box, and loosely mounted on said sleeve, said gear attached to the legend disc, said legend disc also loosely encircling the sleeve, driving means intermittently engaging the gear on said sleeve and continuously engaging the shutter disc, a hub mounted at the front end of said loose sleeve having braces attached to said hub, slides attached to the ends of said braces, said slides traveling on guide rails mounted at the front of cabinet, one of said braces projecting out of the guide rails and having mounted at its end a movable object which continuously revolves around a central object, said central object being stationary at the front end of said horizontal spindle.

2. A display apparatus comprising a stationary sector having a legend to be displayed, a continuously revolving shutter disc with recesses therein cut at different radii, a cabinet at the front of which a window is cut in alignment with the legend of the stationary sector, a shaft extending back from and perpendicular to the front of said cabinet, said revolving shutter disc being attached to said shaft in a tight press fit, a pulley at the rear end of said shaft to receive motion, a hub mounted at the front end of said loose sleeve having braces attached to said hub, slides attached to the ends of said braces, said slides traveling on guide rails mounted at the front of said cabinet, one of said braces projecting out of the guide rails and having mounted at its end a movable object which continuously revolves around a central object, said central object being stationary at the front end of said horizontal spindle.

References Cited

UNITED STATES PATENTS

| | | | |
|---|---|---|---|
| 1,382,226 | 6/1921 | Pyper | 40—139 X |
| 1,809,162 | 6/1931 | Egeland | 40—70 X |
| 2,258,351 | 10/1941 | Brown | 40—34 |
| 2,555,070 | 5/1951 | Wood | 40—33 X |

EUGENE R. CAPOZIO, *Primary Examiner.*

LAWRENCE CHARLES, *Examiner.*

W. GRIEB, *Assistant Examiner.*